(12) United States Patent
Hart et al.

(10) Patent No.: US 11,268,402 B2
(45) Date of Patent: Mar. 8, 2022

(54) BLADE OUTER AIR SEAL COOLING FIN

(71) Applicant: United Technologies Corporation, Farmington, CT (US)

(72) Inventors: Adam Lee Hart, Stuart, FL (US); Brian Levy, Sunny Isles Beach, FL (US); Luis Miguel Ayalde, Weston, FL (US); Jose R. Paulino, Saco, ME (US); Patrick Scheelk, Jensen Beach, FL (US); Nicolas Bueno, St. Johns, FL (US)

(73) Assignee: Raytheon Technologies Corporation, Farmington, CT (US)

( * ) Notice: Subject to any disclaimer, the term of this patent is extended or adjusted under 35 U.S.C. 154(b) by 384 days.

(21) Appl. No.: 15/950,549

(22) Filed: Apr. 11, 2018

(65) Prior Publication Data

US 2019/0316485 A1 Oct. 17, 2019

(51) Int. Cl.
*F01D 25/12* (2006.01)
*F01D 11/08* (2006.01)

(52) U.S. Cl.
CPC .............. *F01D 25/12* (2013.01); *F01D 11/08* (2013.01); *F05D 2220/32* (2013.01); *F05D 2230/237* (2013.01); *F05D 2240/11* (2013.01); *F05D 2240/14* (2013.01); *F05D 2250/11* (2013.01); *F05D 2250/283* (2013.01); *F05D 2260/22141* (2013.01); *F05D 2300/17* (2013.01)

(58) Field of Classification Search
CPC ........ F01D 11/08; F01D 11/12; F01D 11/127; F01D 11/18; F01D 11/24; F01D 25/12; F01D 25/24
See application file for complete search history.

(56) References Cited

U.S. PATENT DOCUMENTS

| 4,017,207 | A | 4/1977 | Bell et al. |
| 6,340,285 | B1 | 1/2002 | Gonyou et al. |
| 6,602,048 | B2 | 8/2003 | Fujikawa et al. |
| 6,910,528 | B2 * | 6/2005 | Abiko ................... F28D 9/0068 165/166 |
| 7,553,128 | B2 | 6/2009 | Abdel-Messeh et al. |

(Continued)

FOREIGN PATENT DOCUMENTS

| EP | 1243886 A1 | 9/2002 |
| EP | 3034808 A2 | 6/2016 |

(Continued)

OTHER PUBLICATIONS

European Search Report dated Aug. 2, 2019 issued for corresponding European Patent Application No. 19156395.6.

(Continued)

*Primary Examiner* — J. Todd Newton
*Assistant Examiner* — Cameron A Corday
(74) *Attorney, Agent, or Firm* — Bachman & LaPointe, P.C.

(57) ABSTRACT

A blade outer air seal (BOAS) for a gas turbine engine according to one disclosed non-limiting embodiment of the present disclosure includes a seal body having a radially inner face and a radially outer face that axially extend between a leading edge portion and a trailing edge portion; and a multitude of cooling fins disposed around the radially outer face of the seal body, at least one of the multitude of cooling fins having at least one aperture.

24 Claims, 7 Drawing Sheets

(56) References Cited

U.S. PATENT DOCUMENTS

| | | |
|---|---|---|
| 9,255,491 B2 | 2/2016 | Blaney et al. |
| 9,574,455 B2 | 2/2017 | McCaffrey |
| 10,329,934 B2 | 6/2019 | Blaney et al. |
| 2009/0035125 A1* | 2/2009 | Fujimoto .............. F01D 25/246 415/116 |
| 2014/0017072 A1* | 1/2014 | McCaffrey .............. F01D 25/12 415/173.1 |
| 2014/0186152 A1* | 7/2014 | McCaffrey .............. F01D 11/18 415/1 |
| 2017/0051624 A1 | 2/2017 | Romanov et al. |
| 2017/0101932 A1 | 4/2017 | Stover et al. |

FOREIGN PATENT DOCUMENTS

| | | |
|---|---|---|
| GB | 1519590 A | 8/1978 |
| GB | 2116639 A | 9/1983 |
| WO | 2015175042 A2 | 11/2015 |
| WO | 2016025054 A2 | 2/2016 |

OTHER PUBLICATIONS

European Office action dated Sep. 22, 2020 issued for corresponding European Patent Application No. 19156395.6.

* cited by examiner

BLADE OUTER AIR SEAL COOLING FIN

U.S. GOVERNMENT RIGHTS

This invention was made with U.S. Government support under contract W58RGZ-16-C-0046 awarded by the United States Army. The U.S. Government has certain rights in the invention.

BACKGROUND

The present disclosure relates generally to a gas turbine engine, and more particularly to a blade outer air seal (BOAS) that may be incorporated into a gas turbine engine.

Gas turbine engines include a compressor that compresses air, a combustor that burns the compressed air, and a turbine across which the combustion gases are expanded. The expansion of the combustion gases drives the turbine, which in turn drives rotation of a power turbine and the compressor.

Turboshaft engines, which are often used in rotary wing aircraft applications, are typically smaller than turbofan aircraft engines and are often subject to prolonged operations in dusty environments. These factors often require an erosion resistant abradable blade outer air seal in the compressor. The relatively small engine diameter makes efficiency and stability sensitive to tip clearance, while the harsh operating environment tends to erode the abradable coatings at undesirable rates.

An engine case of an engine static structure may include one or more blade outer air seals (BOAS) that provide an outer radial flow path boundary for the hot combustion gases. The BOAS surrounds rotor assemblies that rotate and extract energy from the hot combustion gases. The BOAS may be subjected to relatively intense temperatures during gas turbine engine operation.

In order to increase efficiency, a clearance between the blade tips of the rotor assemblies and the outer radial flow path boundary is relatively small. This ensures that a minimum amount of air passes between the blade tips and the outer radial flow path boundary. The abradable outer air seal further reduces the tip clearance as the blade tips are designed to, at times, rub against the blade outer air seal (BOAS). The rubbing wears the abradable material such that the blade tips then have a reduced tip clearance relative to the idealized geometry.

The tip clearance varies throughout the mission and impacts performance Once this growth is predicted through a mission, the BOAS can be configured to maintain the tip clearance at a desirable value. Although effective to configure the tip clearance, cooling fins cast in to the BOAS are relatively heavy in weight and difficult to tailor to specific operational parameters.

SUMMARY

A blade outer air seal (BOAS) for a gas turbine engine according to one disclosed non-limiting embodiment of the present disclosure includes a seal body having a radially inner face and a radially outer face that axially extend between a leading edge portion and a trailing edge portion; and a multitude of cooling fins disposed around the radially outer face of the seal body, at least one of the multitude of cooling fins having at least one aperture.

A further aspect of the present disclosure includes that each of the multitude of cooling fins have at least one aperture.

A further aspect of the present disclosure includes that a first set of the multitude of cooling fins have at least one aperture which defines a first area, and a second set of the multitude of cooling fins have at least one aperture which defines a second area different than the first area.

A further aspect of the present disclosure includes that a first set of the multitude of cooling fins have at least one aperture which defines a first area, and a second set of the multitude of cooling fins do not have an aperture.

A further aspect of the present disclosure includes a seal secured to the radially inner face of the seal body.

A further aspect of the present disclosure includes that the seal is a honeycomb seal.

A further aspect of the present disclosure includes that the at least one cooling fin extends outboard of a radially outermost surface of at least one of the leading edge portion and the trailing edge portion.

A further aspect of the present disclosure includes that the seal body forms a full ring hoop.

A further aspect of the present disclosure includes that the multitude of cooling fins forms a triangular shape in cross-section.

A further aspect of the present disclosure includes that the multitude of cooling fins is manufactured of a nickel-chromium-iron-molybdenum alloy brazed to the radially outer face.

A further aspect of the present disclosure includes that the multitude of cooling fins is manufactured as a single component that is wrapped around the seal body.

A gas turbine engine according to one disclosed non-limiting embodiment of the present disclosure includes an engine casing; a seal body having a radially inner face and a radially outer face that axially extend between a leading edge portion and a trailing edge portion, the radially outer face adjacent to the engine casing; a seal secured to the radially inner face of the seal body; and a multitude of cooling fins disposed around the radially outer face between the leading edge portion and the trailing edge portion, at least one of the a multitude of cooling fins having at least one aperture.

A further aspect of the present disclosure includes that a first set of the multitude of cooling fins have at least one aperture which defines a first area, and a second set of the multitude of cooling fins have at least one aperture which defines a second area different than the first area.

A further aspect of the present disclosure includes that the second set of the multitude of cooling fins are circumferentially located to be adjacent to a port.

A further aspect of the present disclosure includes that a BOAS is positioned radially outward from a blade tip of a blade of at least one of a compressor section and a turbine section.

A further aspect of the present disclosure includes that a first set of the multitude of cooling fins have at least one aperture which defines a first area, the first area associated to with a quantity of airflow to an annular cavity formed by the casing and a BOAS.

A further aspect of the present disclosure includes that a first set of the multitude of cooling fins have at least one aperture which defines a first area, and a second set of the multitude of cooling fins do not have an aperture.

A further aspect of the present disclosure includes that the second set of the multitude of cooling fins are circumferentially located to be adjacent to a port.

A method of controlling a specific rate of thermal expansion that will match a corresponding blade design by using a cooling fin arrangement attached to a blade outer air seal (BOAS) for a gas turbine engine, according to one disclosed non-limiting embodiment of the present disclosure include controlling an area of at least one aperture in each of a multitude of cooling fins disposed around a radially outer face of the seal body.

A further aspect of the present disclosure includes that a first set of the multitude of cooling fins have at least one aperture which defines a first area, and a second set of the multitude of cooling fins have at least one aperture which defines a second area different than the first area, wherein the second set of the multitude of cooling fins are circumferentially located to be adjacent to a port.

The foregoing features and elements may be combined in various combinations without exclusivity, unless expressly indicated otherwise. These features and elements as well as the operation thereof will become more apparent in light of the following description and the accompanying drawings. It should be appreciated that the following description and drawings are intended to be exemplary in nature and non-limiting.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
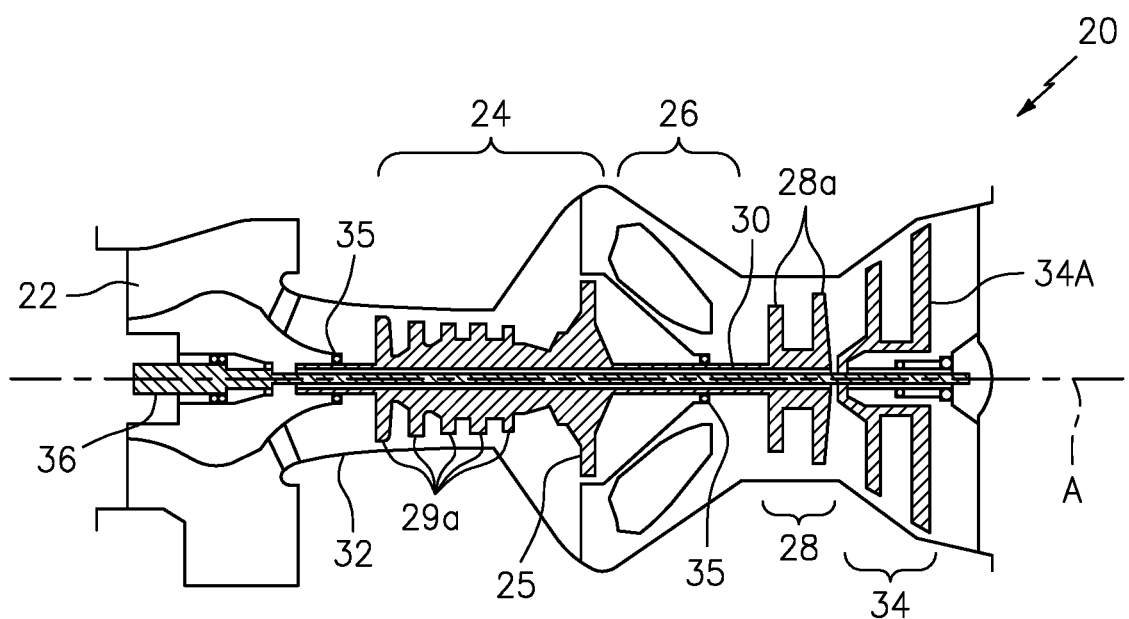
FIG. 1 illustrates an example turboshaft gas turbine engine.

FIG. 1 schematically illustrates a gas turbine engine 20. In this example, the engine 20 is a turboshaft engine, such as for a helicopter. The engine 20 includes an inlet duct 22, a compressor section 24, a combustor section 26, a turbine section 28 and the power turbine section 34. Although engines ingest some amount of dust, such engines are typically not designed for highly dusty environments. Engines such as the engine 20 are subject to operating in highly dusty environments during hover, takeoff, and landing.

The compressor section 24 may include an axial compressor with a multitude of circumferentially-spaced blades 24a and a centrifugal compressor 25. The turbine section 28 includes circumferentially-spaced turbine blades 28a. The compressor section 24 and the turbine section 28 are mounted on a main shaft 30 for rotation about an engine central longitudinal axis A relative to an engine static structure 32 via several bearing systems 35. The compressor section 24 and the turbine section 28 drives the power turbine section 34 that drives an output shaft 36. In this example engine, the compressor section 24 has five stages, the turbine section 28 has two stages and the power turbine section 34 has two stages.

During operation, the compressor section 24 draws air through the inlet duct 22. In this example, the inlet duct 22 opens radially relative to the central longitudinal axis A. The compressor section 24 compresses the air, and the compressed air is then mixed with fuel and burned in the combustor section 26 to form a high pressure, hot gas stream. The hot gas stream is expanded in the turbine section 28 and the power turbine section 34, which rotationally drives the compressor section 24, and the output shaft 36. The compressor section 24, the combustor section 26, and the turbine section 28 are often referred to as the gas generator, while the power turbine section 34 and the output shaft 36 are referred to as the power section. Although not shown, the main shaft 30 may also drive a generator or other accessories through an accessory gearbox. The gas generator creates the hot expanding gases to drive the power section. Depending on the design, the engine accessories may be driven either by the gas generator or by the power section. Typically, the gas generator and power section are mechanically separate such that each rotate at different speeds appropriate for the conditions, referred to as a 'free power turbine'.

Figure 2:
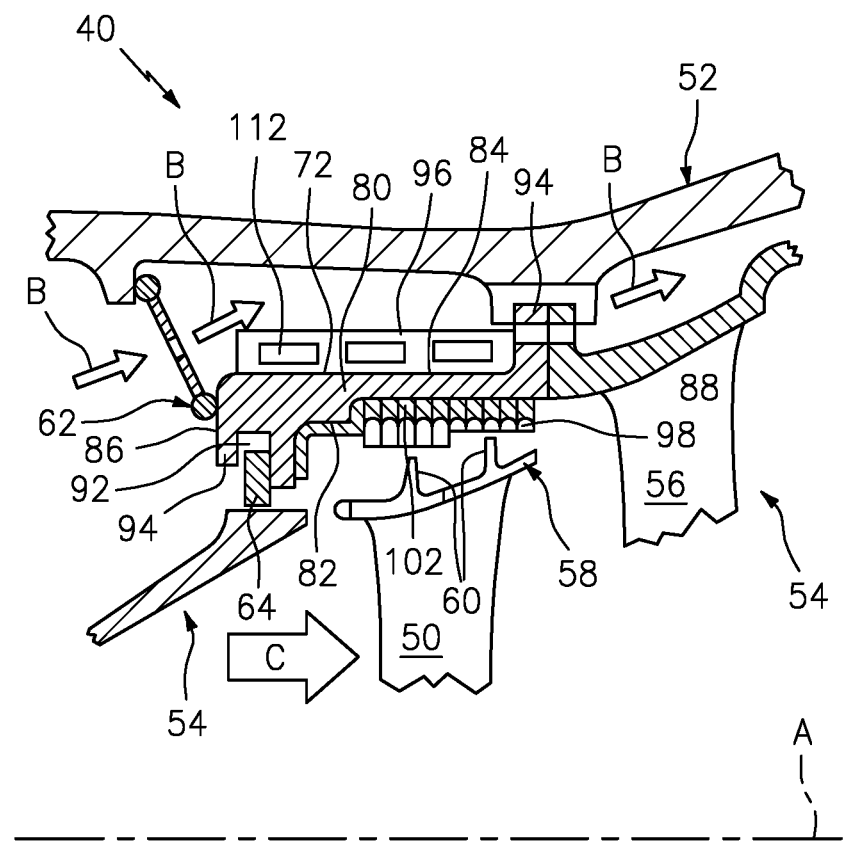
FIG. 2 illustrates a seal for the gas turbine engine according to one disclosed non-limiting embodiment.

FIG. 2 illustrates an engine section 40 of the gas turbine engine 20 of FIG. 1. In this embodiment, the engine section 40 represents part of the turbine section 28. However, it should be appreciated that other engine architectures and engine sections will benefit herefrom. In this embodiment, a blade 50 such as the turbine blade 28A of FIG. 1, (only one shown, although multiple blades could be circumferentially disposed about a rotor disk (not shown) within the engine section 40) is mounted for rotation relative to an engine case 52. The engine section 40 can also include a vane assembly 54 supported within the case 52 downstream from the blade 50. The vane assembly 54 includes one or more vanes 56 that prepare the airflow for the next stage of blades. Additional vane assemblies could also be disposed within the engine section 40, including upstream from the blade 50.

The blade 50 includes a blade tip 58 that is located at a radially outermost portion of the blade 50. In this exemplary embodiment, the blade tip 58 includes a knife edge 60 that extends toward a blade outer air seal (BOAS) 72. The BOAS 72 establishes an outer radial flow path boundary of the core flow path C. The knife edge 60 and the BOAS 72 cooperate to limit airflow leakage around the blade tip 58.

Figure 3:
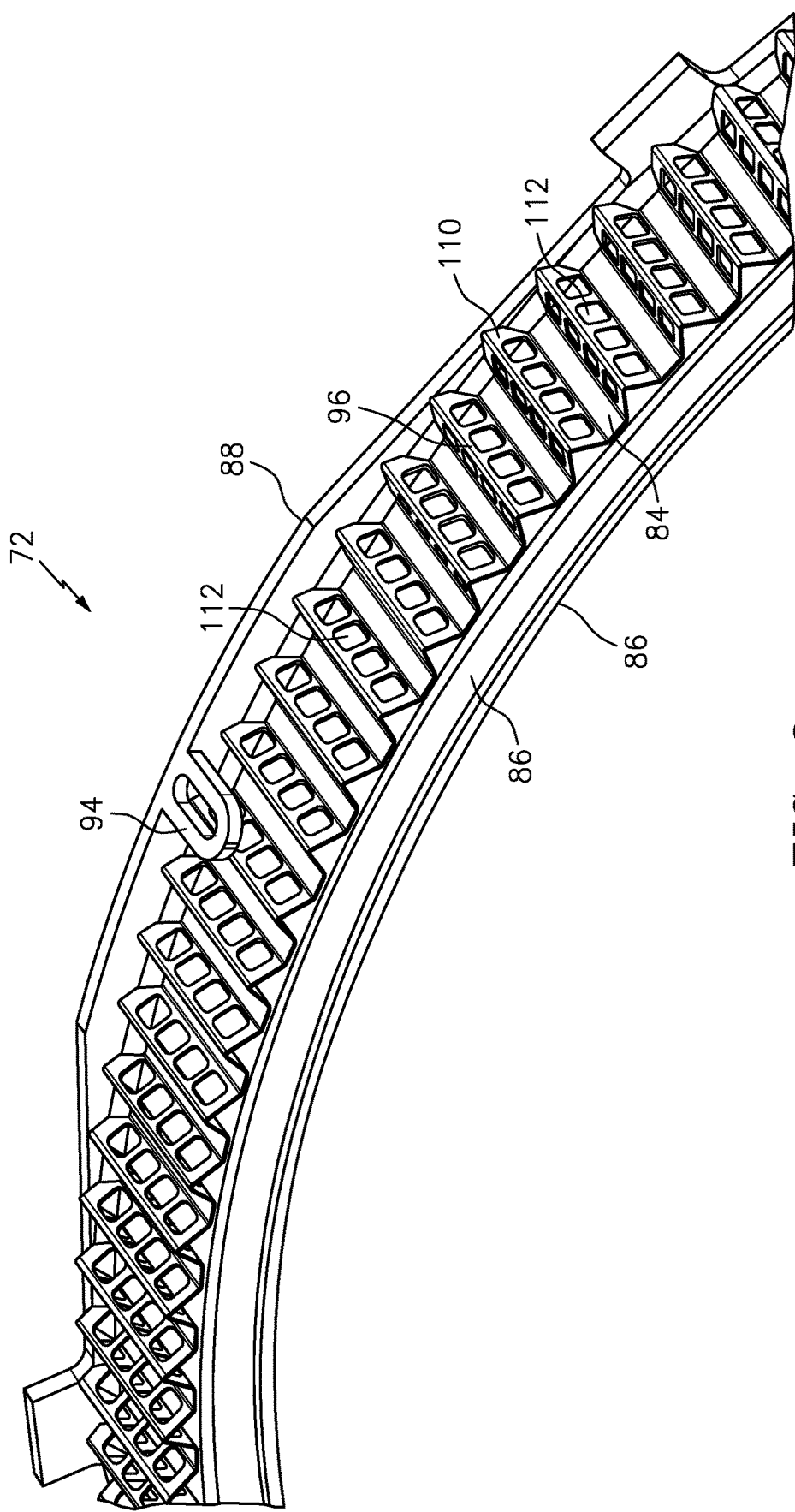
FIG. 3 illustrates a seal for the gas turbine engine according to another disclosed non-limiting embodiment.

The BOAS 72 is disposed in an annulus radially between the case 52 and the blade tip 58. Although this particular embodiment is illustrated in a cross-sectional view, the BOAS 72 may form a full ring hoop assembly (FIG. 3) that circumscribes associated blades 50 of a stage.

A seal member 62 is mounted radially inward from the case 52 to the BOAS 72 to limit the amount of cooling airflow B injected into the annular cavity formed by the case 52 and the BOAS 72. A second seal member 64 can also be used, in conjunction with a flowpath member, to limit the amount of airflow leakage into the core flow path C. The second seal member 64 retains the BOAS 72. The seal member 62 retains the BOAS 72 axially against the adjacent vane assembly 54, which forms a seal between the BOAS 72 and the vanes 56 to further limit cooling airflow B leakage into the core flow path C. In this embodiment, a dedicated cooling airflow B, such as bleed airflow, is not communicated into the BOAS 72 thence into the core flow path C, instead, and as is further discussed below, the BOAS 72 includes cooling features that increase a local heat transfer effect without requiring a large flow pressure ratio.

The BOAS 72 of this exemplary embodiment is a full ring BOAS that can be circumferentially disposed about the engine centerline longitudinal axis A. The BOAS 72 includes a seal body 80 having a radially inner face 82 and a radially outer face 84. Once positioned within the gas turbine engine 20, the radially inner face 82 is directed toward the blade tip 58 (i.e., the radially inner face 82 is positioned on the core flow path side) and the radially outer face 84 faces the case 52 (i.e., the radially outer face 84 is positioned on the non-core flow path side). The radially inner face 82 and the radially outer face 84 axially extend between a leading edge portion 86 and a trailing edge portion 88.

Figure 4:
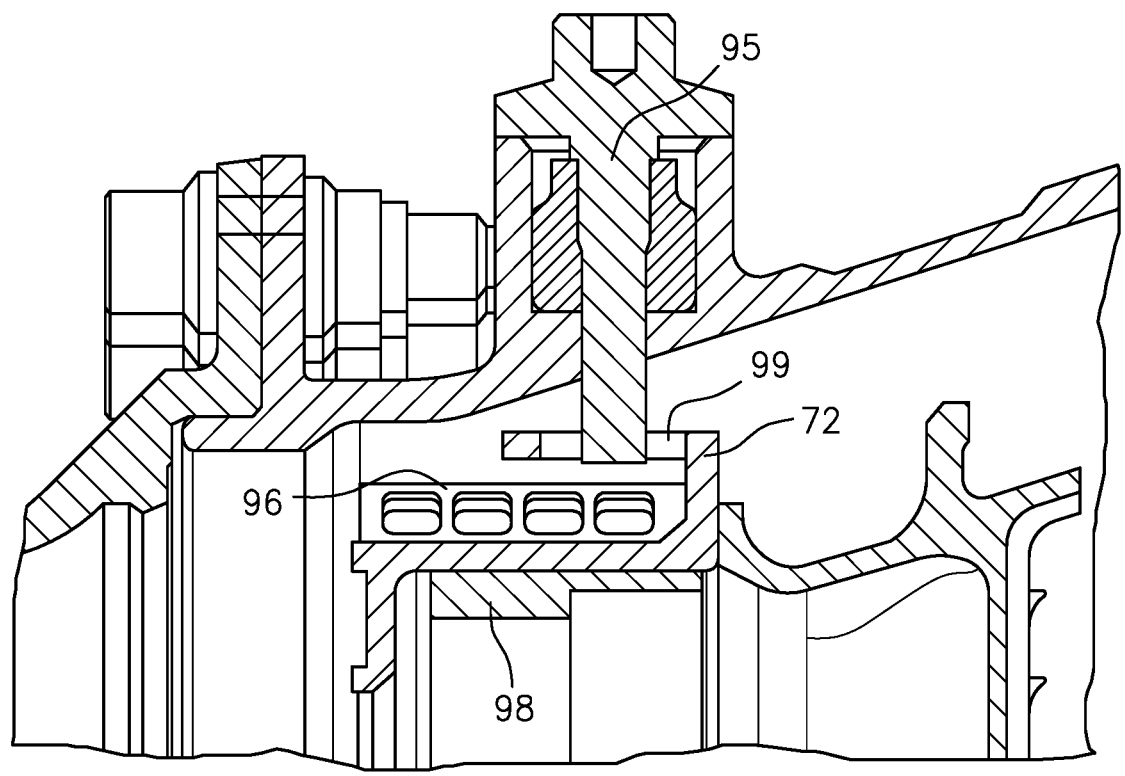
FIG. 4 illustrates a seal for the gas turbine engine according to another disclosed non-limiting embodiment.

The leading edge portion 86 and the trailing edge portion 88 may include one or more attachment features 94 for attaching the BOAS 72 (FIG. 4). In this exemplary embodiment, the leading edge portion 86 includes a hook 92 that receives the second seal member 64 to seal the BOAS 72 to the flowpath member and the trailing edge portion 88 includes the feature 94 through which is received a fastener 95 (FIG. 4).

The BOAS 72 includes one or more cooling fins 96 disposed on the radially outer face 84 of the seal body 80. In this exemplary embodiment, the BOAS 72 includes a plurality of cooling fins 96. The cooling fins 96 can extend between a length L that extends between the leading edge portion 86 and the trailing edge portion 88. In one exemplary embodiment, the cooling fins 96 extend across the entire length L between the leading edge portion 86 and the trailing edge portion 88.

In one exemplary embodiment, the BOAS 72 is made of a material having a relatively low coefficient of thermal expansion such as a nickel-chromium-iron-molybdenum alloy or other material that possesses a desired combination of oxidation resistance, fabricability and high-temperature strength. Example materials include, but are not limited to, Mar-M-247, Hastaloy N, Hayes 242, IN792+Hf, HASTEL-LOY® X alloy (UNS N06002 (W86002). Other materials may also be utilized within the scope of this disclosure.

A seal 98 can be secured to the radially inner face 82 of the seal body 80. The seal 98 can be brazed to the radially inner face 82 or could be attached using other known attachment techniques. In one example, the seal 98 is a honeycomb seal that interacts with a blade tip 58 of a blade 50 (FIG. 2) to reduce airflow leakage around the blade tip 58.

A thermal barrier coating 102 can also be applied to at least a portion of the radially inner face 82 and/or the seal 98. In this exemplary embodiment, the thermal barrier coating 102 is applied to the radially inner face 82 between the leading edge portion 86 and the trailing edge portion 88. The thermal barrier coating 102 could also partially or completely fill the seal 98 of the BOAS 72. The thermal barrier coating 102 may also be deposited on any flow path connected portion of the BOAS 72 to protect the underlying substrate of the BOAS 72 from exposure to hot gas, reducing thermal fatigue and to enable higher operating conditions. A suitable low conductivity thermal barrier coating 102 can be used to increase the effectiveness of the cooling fins 96 by reducing the heat transfer from the core flow path C to the airflow B.

With reference to FIG. 4, the cooling fins 96 may be manufactured of a nickel-chromium-iron-molybdenum alloy brazed to the radially outer face 84 of the seal body 80. This permits the BOAS 72 to be designed specifically for the cooling rate that is desired by simply changing the geometry of the cooling fins and apertures 112 in the cooling fins. That is, the cooling fins 96 can be a corrugated full hoop specifically designed for a particular engine, operating environment, flight condition, and/or other characteristic that is brazed to the radially outer face 84 of the seal body 80. Alternatively, the cooling fins 96 are individual elements attached to the to the radially outer face 84 of the seal body 80. Utilization of the cooling fins 96 permits the BOAS 72 to be produced in a more modular design that can be used across various engines, and at a lower cost and much lighter weight than having the cooling fins cast in to the BOAS 72.

Figure 5:
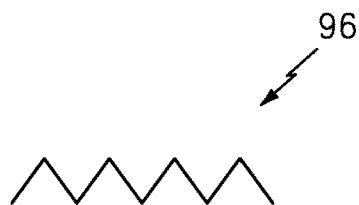
FIG. 5-10 illustrates various outer profiles for cooling fins.
Figure 6:
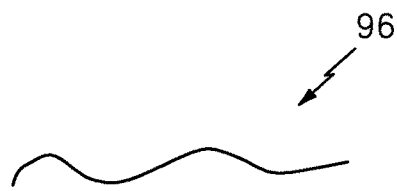
Figure 7:
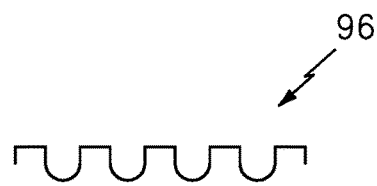
Figure 8:
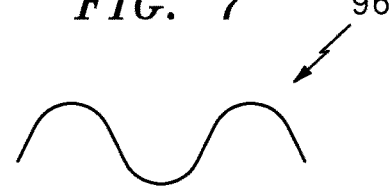
Figure 9:
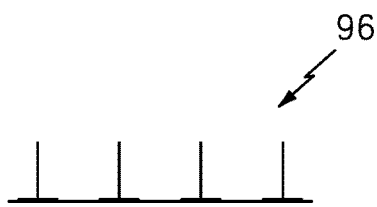
Figure 10:
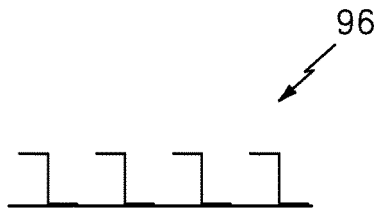

The cooling fins 96 include an outer profile 110. The outer profile 110 can form various geometries, spacing, angles relative to the radially outer face 84, shapes, number and size of apertures 112, etc. For example, the cooling fins 96 may have a circumferentially spacing which forms an outer profile 110 that is triangular (FIG. 5), sinusoidal (FIG. 6), corrugations (FIG. 7), waves (FIG. 8), upside down "T" shapes (FIG. 9), upside down "L" shapes (FIG. 10), irregular shape in cross-section etc. In another example, the cooling fins 96 may be stepped or otherwise shaped between the leading edge portion 86 and the trailing edge portion 88.

Figure 11:
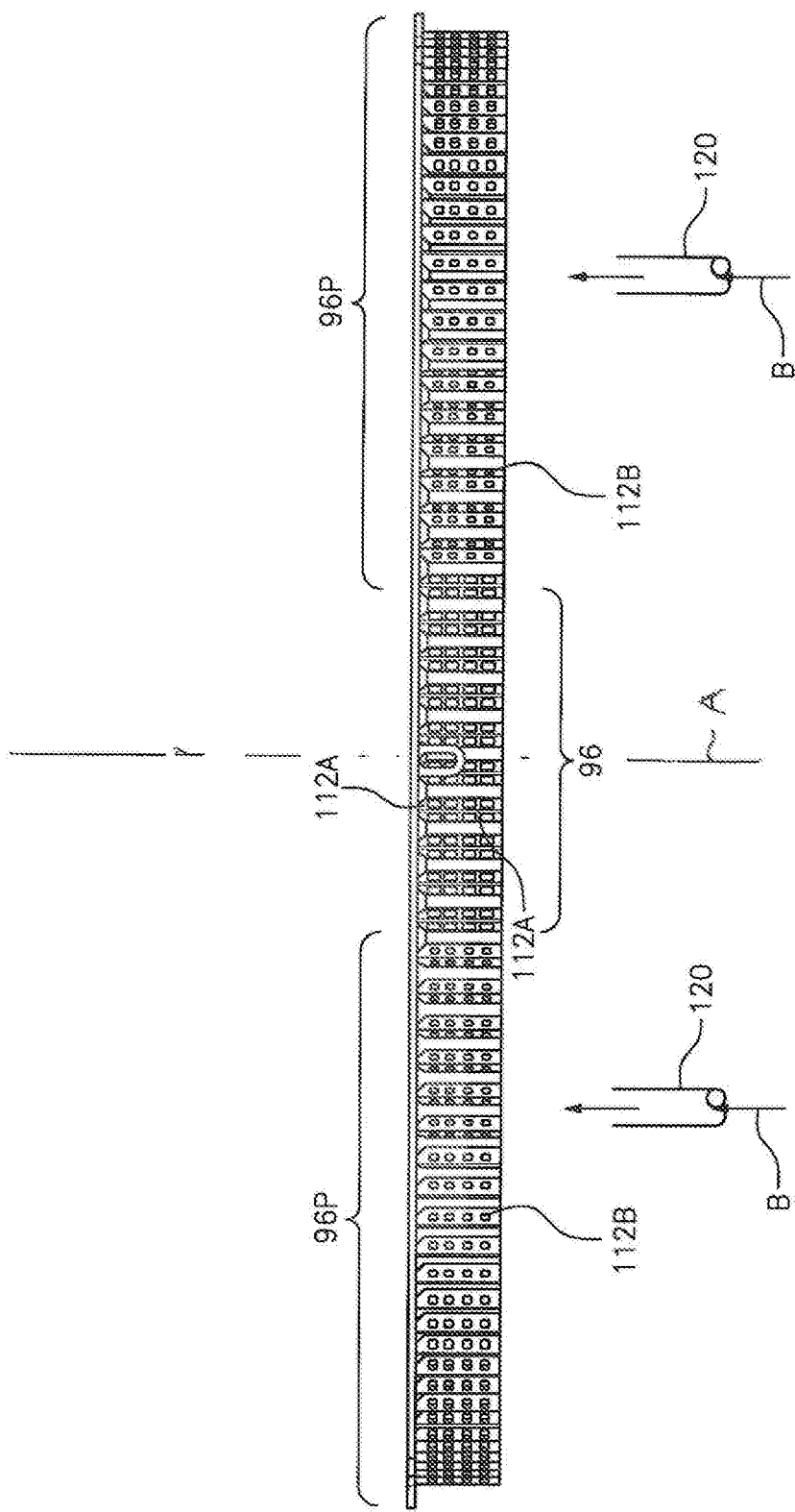
FIG. 11 illustrates a seal for the gas turbine engine according to another disclosed non-limiting embodiment.

With reference to FIG. 11, the number and size of apertures 112 within the cooling fins 96 can also be specifically tailored during manufacture of the cooling fins 96. For example, a first set of the cooling fins 96 have at least one aperture 112A which defines a first area, and a second set of the cooling fins 96 have at least one aperture 112B which defines a second area different than the first area. The circumferential cooling of the BOAS 72 is thus specifically tailored.

In another example, the cooling fins 96P adjacent to a cooling airflow injection port 120 include no apertures or apertures of minimum area as such circumferential areas necessarily receive a greater volume of relatively cooler cooling airflow B than the cooling fins 96 circumferentially distant from such ports 120. Typically, the engine 20 may include a multiple of ports 120 displaced around the turbine.

Figure 12:
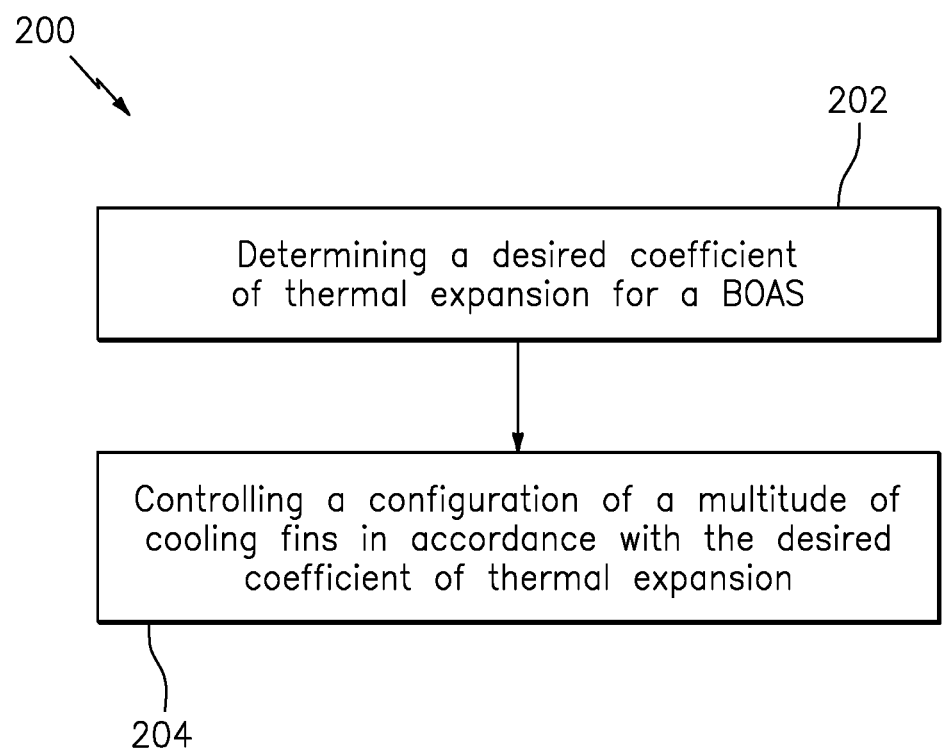
FIG. 12 illustrates a method of controlling a specific rate of thermal expansion that will match a corresponding blade design by using a cooling fin configuration attached to the BOAS.

With reference to FIG. 12, a method 200 of controlling a specific rate of thermal expansion that will match a corresponding blade design by using a cooling fin 96 configuration attached to the BOAS 72 for a gas turbine engine includes determining a desired coefficient of thermal expansion for the BOAS (step 202). The desired coefficient of thermal expansion for the BOAS 72 can be specifically designed for a particular engine, operating environment, flight condition, and/or other characteristic. Then, a configuration of the cooling fins 96 are manufactured (step 204) in accords with the desired coefficient of thermal expansion and brazed to the radially outer face 84 of the seal body 80.

Although a combination of features is shown in the illustrated examples, not all of them need to be combined to realize the benefits of various embodiments of this disclosure. In other words, a system designed according to an embodiment of this disclosure will not necessarily include all of the features shown in any one of the figures or all of the portions schematically shown in the figures. Moreover, selected features of one example embodiment may be combined with selected features of other example embodiments.

The elements described and depicted herein, including in flow charts and block diagrams throughout the figures may show logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed is:

1. A blade outer air seal (BOAS) for a gas turbine engine, comprising:
    a seal body having a radially inner face and a radially outer face that axially extend between a leading edge portion and a trailing edge portion, wherein the seal body forms a contiguous full ring hoop; and
    a multitude of cooling fins attached around the radially outer face of the seal body, each of the multitude of cooling fins extend between the leading edge portion and the trailing edge portion, each of the multitude of cooling fins having at least one aperture transverse to the engine central longitudinal axis, the multitude of cooling fins arranged around the seal body such that each of the multitude of cooling fins are arranged generally parallel to an engine central longitudinal axis.

2. The blade outer air seal (BOAS) as recited in claim 1, wherein a first set of the multitude of cooling fins have at least one aperture which defines a first area, and a second set of the multitude of cooling fins have at least one aperture which defines a second area different than the first area.

3. The blade outer air seal (BOAS) as recited in claim 1, further comprising a seal secured to the radially inner face of the seal body.

4. The blade outer air seal (BOAS) as recited in claim 3, wherein the seal is a honeycomb seal.

5. The blade outer air seal (BOAS) as recited in claim 1, wherein the multitude of cooling fins extends outboard of a radially outermost surface of at least one of the leading edge portion and the trailing edge portion.

6. The blade outer air seal (BOAS) as recited in claim 1, wherein each of the multitude of cooling fins forms a triangular shape in cross-section.

7. The blade outer air seal (BOAS) as recited in claim 1, wherein the multitude of cooling fins is manufactured of a nickel-chromium-iron-molybdenum alloy brazed to the radially outer face.

8. The blade outer air seal (BOAS) as recited in claim 7, wherein the multitude of cooling fins is manufactured as a single component that is wrapped around the seal body, each of the multitude of cooling fins form a triangular shape in cross-section.

9. A gas turbine engine, comprising:
    an engine casing;
    a seal body having a radially inner face and a radially outer face that axially extend between a leading edge portion and a trailing edge portion, the radially outer face adjacent to the engine casing, wherein the seal body forms a contiguous full ring hoop;
    a honeycomb seal secured to the radially inner face of the full ring hoop seal body;
    a multitude of cooling fins disposed around the radially outer face and spaced from the engine casing, each of the multitude of cooling fins extend between the leading edge portion and the trailing edge portion, each of the multitude of cooling fins having at least one aperture, the multitude of cooling fins manufactured as a single component that is wrapped around the seal body such that each of the multitude of cooling fins are arranged parallel to an engine central longitudinal axis, a first set of the multitude of cooling fins have at least one aperture transverse to the engine central longitudinal axis which defines a first area, and a second set of the multitude of cooling fins have at least one aperture transverse to the engine central longitudinal axis which defines a second area less than the first area, the second set of the multitude of cooling fins are circumferentially offset from the first set of the multitude of cooling fins to be adjacent to a cooling airflow injection port which injects cooling airflow parallel to the engine central longitudinal axis; and
    a seal member mounted radially inward from the engine casing to the BOAS to limit the amount of cooling airflow injected into an annular cavity formed by the engine case and the BOAS.

10. The gas turbine engine as recited in claim 9, wherein a BOAS is positioned radially outward from a blade tip of a blade of at least one of a compressor section and a turbine section.

11. The gas turbine engine as recited in claim 9, wherein the first area is associated with a quantity of airflow to an annular cavity formed by the casing and a BOAS to provide a desired coefficient of thermal expansion for a blade outer air seal (BOAS).

12. A method of controlling a specific rate of thermal expansion that will match a corresponding blade design by using a cooling fin arrangement attached to a blade outer air seal (BOAS) for a gas turbine engine, comprising:

determining a desired coefficient of thermal expansion for a blade outer air seal (BOAS), wherein the blade outer air seal (BOAS) forms a full ring hoop;

manufacturing a configuration of cooling fins in accords with the desired coefficient of thermal expansion, an area of at least one aperture in each of a multitude of cooling fins disposed around a radially outer face of a seal body, a first set of the multitude of cooling fins have at least one aperture which defines a first area, and a second set of the multitude of cooling fins have at least one aperture which defines a second area different than the first area;

wrapping the configuration of cooling fins around the seal body such that each of the multitude of cooling fins are arranged parallel to an engine central longitudinal axis and the at least one aperture is transverse to the engine central longitudinal axis and the second set of the multitude of cooling fins are circumferentially offset from the first set of the multitude of cooling fins to be adjacent to a cooling airflow injection port; and brazing the configuration of cooling fins as a corrugated full hoop to a radially outer face of the seal body.

13. The blade outer air seal (BOAS) as recited in claim 2, further comprising a cooling airflow injection port which injects cooling airflow parallel to the engine axis.

14. The blade outer air seal (BOAS) as recited in claim 13, wherein the second set of the multitude of cooling fins are circumferentially located adjacent to the cooling airflow injection port.

15. The blade outer air seal (BOAS) as recited in claim 7, wherein the multitude of cooling fins are a corrugated full hoop.

16. The gas turbine engine as recited in claim 9, wherein the multitude of cooling fins are manufactured of a nickel-chromium-iron-molybdenum alloy brazed to the radially outer face.

17. The gas turbine engine as recited in claim 16, wherein the multitude of cooling fins are a corrugated full hoop.

18. The blade outer air seal (BOAS) as recited in claim 1, wherein each of the multitude of cooling fins are arranged parallel to the engine axis.

19. The blade outer air seal (BOAS) as recited in claim 1, wherein the multitude of cooling fins have a circumferentially spacing which forms an outer profile that is triangular.

20. The blade outer air seal (BOAS) as recited in claim 1, wherein the multitude of cooling fins have a circumferentially spacing which forms an outer profile that is sinusoidal.

21. The blade outer air seal (BOAS) as recited in claim 1, wherein the multitude of cooling fins have a circumferentially spacing which forms an outer profile that is an upside down "T" shape.

22. The blade outer air seal (BOAS) as recited in claim 1, wherein the multitude of cooling fins have a circumferentially spacing which forms an outer profile that is an upside down "L" shape.

23. The blade outer air seal (BOAS) as recited in claim 1, further comprising a multiple apertures within each of the multitude of cooling fins.

24. The blade outer air seal (BOAS) as recited in claim 23, wherein the multitude of cooling fins extend across the entire length between the leading edge portion and the trailing edge portion.

* * * * *